US005650029A

United States Patent [19]

Lafond

[11] Patent Number: 5,650,029

[45] Date of Patent: Jul. 22, 1997

[54] METHOD FOR APPLYING SEALANT MATERIAL IN AN INSULATED GLASS ASSEMBLY

[76] Inventor: Luc Lafond, 23 Woodvalley Drive, Etobicoke, Ontario, Canada, M9A 4H4

[21] Appl. No.: 513,179

[22] Filed: Aug. 9, 1995

[51] Int. Cl.$^6$ .......... C03C 27/10

[52] U.S. Cl. .......... 156/107; 156/109; 156/244.22; 156/578

[58] Field of Search .......... 156/107, 109, 156/102, 244.22, 578, 500, 281; 118/104, 108, 63; 264/261

[56] References Cited

U.S. PATENT DOCUMENTS

| | | | |
|---|---|---|---|
| 4,088,522 | 5/1978 | Mercier et al. | 156/107 |
| 4,110,148 | 8/1978 | Rocholl | 156/109 |
| 4,145,237 | 3/1979 | Mercier et al. | 156/107 |
| 4,205,104 | 5/1980 | Chenel | 428/34 |
| 4,234,372 | 11/1980 | Bernhard et al. | 156/356 |
| 4,561,929 | 12/1985 | Lenhardt | 156/522 |
| 4,743,336 | 5/1988 | White | 156/522 |
| 4,759,810 | 7/1988 | Jackson et al. | 156/64 |
| 4,780,164 | 10/1988 | Rueckheim et al. | 156/104 |
| 4,826,547 | 5/1989 | Lenhardt | 156/109 |

*Primary Examiner*—Michael W. Ball
*Assistant Examiner*—Michael A. Tolin
*Attorney, Agent, or Firm*—Paul Sharpe; McFadden, Fincham

[57] ABSTRACT

There is disclosed a method for applying sealant material between spaced-apart substrates in an insulated glass assembly. The method is sequential and employs extrusion nozzles and smoothing plates. The smoothing plates move in concert with the extrusion nozzles to ensure uniform distribution of the sealant material from the spacer, spacing the substrates, to the perimeter of the substrates. The smoothing plates ensure a uniform and planar surface at the perimeter. The method of operation is automated and accordingly, the sealant can be applied in an expedited manner with a high degree of precision and uniformity.

5 Claims, 4 Drawing Sheets

METHOD FOR APPLYING SEALANT MATERIAL IN AN INSULATED GLASS ASSEMBLY

FIELD OF THE INVENTION

The present invention relates to the application of sealant material to a substrate and more particularly, the present invention relates to a method of applying sealant between spaced-apart substrates in an insulated glass assembly.

BACKGROUND OF THE INVENTION

The application of adhesive or other sealant material to substrates is well known and is particularly well known in the insulated glass assembly art. In the insulated glass art, it is important to ensure that the perimeter of a unit is completely sealed. If this is not ensured, the result is the ingress of moisture or debris which eventually leads to the premature degradation insulated assembly.

In view of this difficulty, the art has proposed numerous methods and various apparatus to ensure uniform application of sealant material in the assemblies. Typical of the known arrangements is extrusion heads which are either automated or manual. One of the primary difficulties of the known arrangements is that the depth of the sealant material cannot be uniformly applied in width or depth about the perimeter and further, the known arrangements are limited in that they do not positively avoid entrapment of air within the sealant material. A further limitation is that the most extreme perimeter of the sealant material cannot be perfectly perpendicular relative to the substrate surface. The result of this is, therefore, surface irregularity about the perimeter as opposed to a smooth planar finish which would be more desirable from an aesthetic point of view as well as a structural point of view.

In view of the existing limitations in the sealant applying art, there exists a need for an improved method of disposing sealant between, for example, insulated glass assemblies.

SUMMARY OF THE INVENTION

It is one object of the present invention to provide an improved process of disposing sealant material between spaced-apart substrates.

A further object of one embodiment of the present invention is to provide a method of sequentially applying sealant material on the perimeter of a substrate comprising the steps of:

a. injecting, in a first injection step, sealant material along a first side of the substrate;

b. advancing the substrate;

c. injecting, in a second injection step, sealant material along a second side and a third side of the substrate simultaneously during the advancing step; and d. injecting, in a terminal injection step, sealant material along a fourth side of the substrate whereby the sealant is continuous about the perimeter of the substrate.

It has been found that precise application of the sealant with uniformity about the perimeter of the insulated assembly can be achieved by making use of the automated system according to the present invention. The uniform application is important in assemblies having gas charged or vacuum atmospheres as well as for structural considerations. The present method ensures integral contact of the sealant with the substrate.

An attendant advantage to the method according to one embodiment of the invention is the provision of sequentially applying the sealant in a timed sequence to ensure application of the sealant in a continuous manner about the perimeter. This obviates the primary limitations which exist in the known methods currently practiced in the art.

Conveniently, the use of "smoothing" or wiping members have a dramatic effect on the uniformity and smoothness of the outer perimeter of the sealant.

Further, in view of the fact that the injection members and wiping/smoothing members comprise a cooperative unit, a high quality result is attainable in an expedited manner.

Another object of the present invention, according to one embodiment thereof, is to provide a method of applying sealant material between spaced substrates having a spacer spaced inwardly from the perimeter of the assembly, the substrates having a pair of opposed lateral sides and a pair of transverse sides, comprising the steps of:

a. providing applying means for applying sealant material between the substrates;

b. advancing the applying means from a starting position to a distal position to apply sealant material at a first transverse side;

c. advancing the substrates;

d. applying sealant material to each the lateral side simultaneously and during movement of the substrates; and, e. reversibly advancing the applying means from the distal position to the start position while applying sealant material to the second transverse side.

The smoothing members may comprise plates which are cooperatively and slidably connected to the sealant applying means, the latter comprising extrusion nozzles as one possible example. By providing concerted movement of the nozzle with its smoothing plate, the area between the plate and the spacer used to space the substrates in spaced relation can be completed filled with sealant and the outer perimeter smoothed over to a planar surface. Marked advantages have been realized by providing a sliding motion between the nozzles and plates. This motion is more advantageous than the pivoting motion ascribed to the devices in the prior art. In a pivoting system, the sealant is stretched about a corner. In the present system, a pair of cooperative nozzles fill a corner to ensure uniform application of sealant without any stretching or other deformation thereof.

The smoothing plates will, of course, be adjustable to accommodate a variety of widths of substrates as well as to accommodate differing distances between the substrates and may optionally include a surface which has a low surface tension. By providing a surface with a low surface tension, the sealant or fill material, as it is smoothed by the plates, will not significantly adhere to the plates and, therefore, will not impede the smoothing operation. To complement the low friction surface, the plates may be heated to a point above the melting point of the sealant/fill to further enhance the smoothing operation.

One of the more important features according to the present invention is that the method results in very efficient processing of insulated assemblies in an expedited manner. According to the method, movement of the extrusion nozzles or heads is kept to an absolute minimum and this is partly achieved by advancing the substrate of the insulated assembly to be treated, relative to the nozzles. Once a side has been treated, simple repositioning of the nozzles and plates can be achieved to facilitate sealant of the remaining sides followed by reconfiguration of the elements to an initial starting position once the entire substrate or assembly has been treated with sealant.

Advantageously, the cornering achieved in the method according to the present invention permits the corners to be molded and therefore continues with the sides of the assembly. This facilitates the manufacture of dependable and energy efficient assemblies and is particularly effective to prevent the formation of unfilled areas or "air pockets" in the perimeter.

In an alternate embodiment, the method may be practiced using irregularly shaped substrate profiles. Further, the method may be practiced to manufacture sliding doors, wall panels, etc.

Having thus described the invention, reference will now be made to the accompanying drawings illustrating preferred embodiments.

DETAILED DESCRIPTION OF THE PREFERRED EMBODIMENTS

Figure 1:
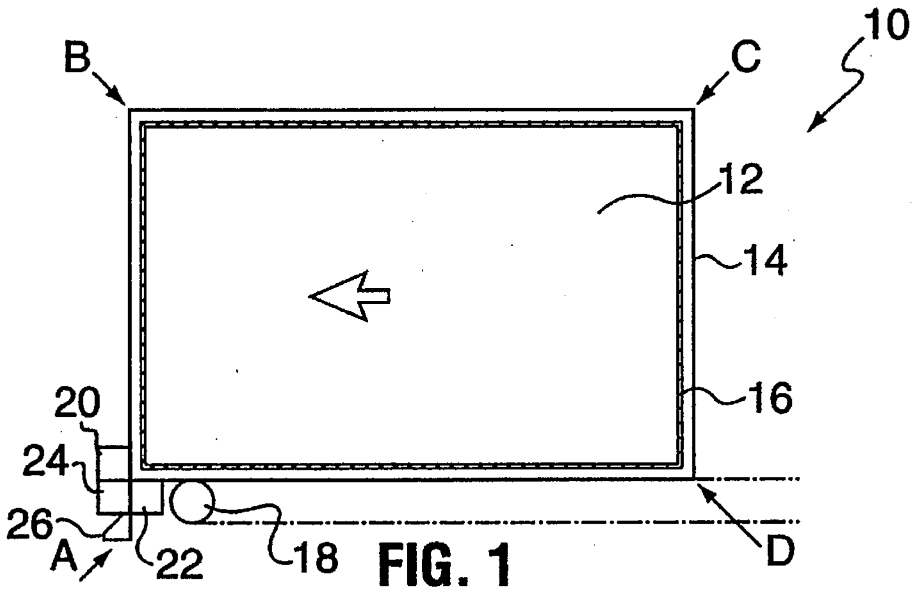
FIG. 1 is a top plan schematic view of an insulated glass assembly and the sealant applying members in an initial start position.

Referring now to the drawings, and more particularly FIG. 1, shown is a top plan view of a first stage of the application procedure. The substrate assembly, globally denoted by FIG. 10, includes a pair of spaced-apart glass substrates. Only one of the substrates, denoted by numeral 12, is shown in the top plan view, however, it will be readily appreciated by those skilled that insulated assemblies are well known and include two spaced-apart substrates. The procedure described hereinafter may be performed on an assembly or on a single substrate onto which is added a second substrate in a downstream operation.

Substrate 12 includes a perimeter 14 and a spacer member 16 spaced inwardly from the perimeter and continuous thereabout. The spacer 16 may comprise any suitable material such as polysilicones, PET, as well as other materials which do not permit any significant energy transmission between the substrates.

The assembly 10 is positioned on a transfer apparatus, an example of which is a conveyor table. This is shown in schematic illustration and is denoted by numeral 18 in FIG. 1.

Turning now to greater detail with respect to the application assembly for applying the sealant material about the perimeter of the assembly 10, numerals 20 and 22 denote the sealant application members for applying the sealant between the substrates and about the perimeter of the assembly 10. Suitable devices for applying the sealant include extrusion heads, well known in the art, or any other suitable apparatus for achieving this purpose.

For concerted operation with extrusion heads 20 and 22, there is included a pair of wiping or smoothing members 24 and 26 which cooperate with heads 20 and 22. The heads 20, 22 and members 24, 26 are slidable relative to one another.

As is illustrated in FIG. 1, all of the elements 20 through 26 are grouped in a configuration such that the extrusion heads 20 and 22 are positioned at the intersection of two sides of the assembly 10 and more particularly on opposite sides of the corner A. Initially, wiping members or smoothing members 24 and 26 are positioned in a collinear manner with head 20. As illustrated in FIG. 1, this configuration represents the "start" position.

Figure 2:
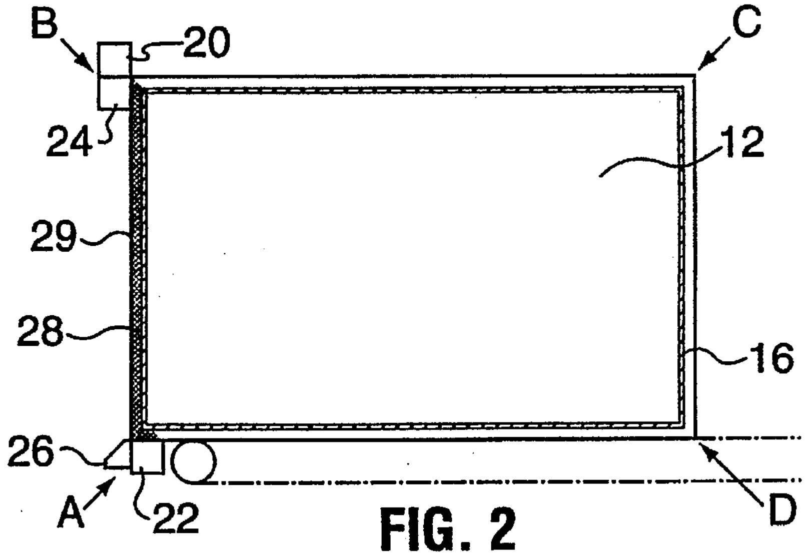
FIG. 2 is a view similar to FIG. 1 illustrating the disposition of the sealant applying members after a first side of the assembly has been treated.

Turning to FIG. 2, shown is a schematic representation of the elements 20 through 26 as they are disposed about the assembly 10 subsequent to a first application of the sealant. The sealant is shown in the illustration and represented by numeral 28. The sealant will be referred to as sealant 28 hereinafter. As illustrated, one of the transverse side 29 of the assembly is filled with sealant material 28. As is additionally illustrated in the Figure, extrusion head 20 and wiper member 24 have been advanced from the start position of FIG. 1 generally at corner A to corner B of assembly 10. The disposition of extrusion head 20 and wiping member 24 is such that they both exist in a collinear relationship and are parallel to the transverse side of the assembly 10. With respect to wiping member 26, this element has moved to a collinear position with extrusion head 22, generally corner A of the assembly 10. As illustrated, extrusion head 22 has been moved to the point that there has been deposited sealant material 34, at least partially about the corner of the assembly at the starting position. In this manner, the corner B is molded by the cooperation of extrusion head 22 and wiper 26. Once positioned about this corner, the sealant 28 can be injected as shown. For cornering operations hereinafter, a similar procedure is followed using the respective extrusion head and wiper member.

Figure 3:
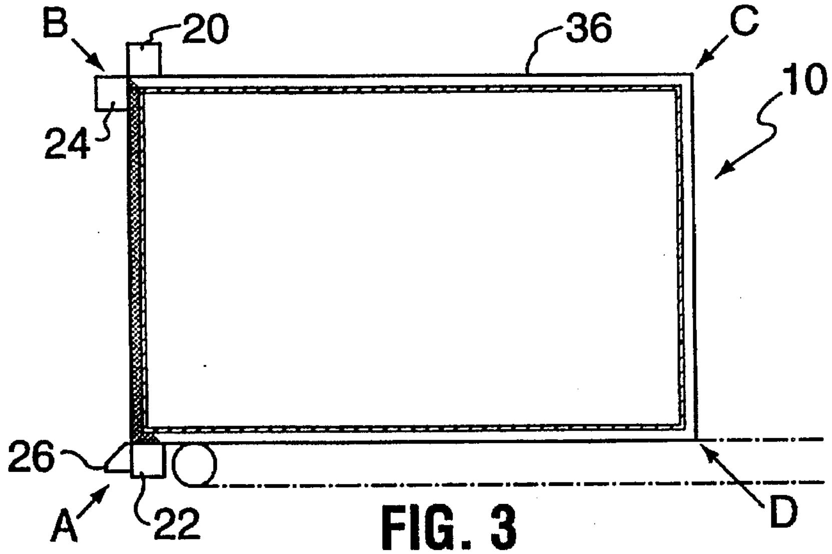
FIG. 3 is a subsequent view illustrating the disposition of the elements in a repositioned arrangement prior to the treatment of additional sides of the assembly.

FIG. 3 illustrates the next sequential operation in the process where head 20 has moved from a collinear position relative to wiper member 24 to a non-linear position where the same is positioned to apply sealant material along one of the lateral sides 36 of the assembly 10. As illustrated, the extrusion head 20 is positioned on side 36 of the assembly.

Figure 4:
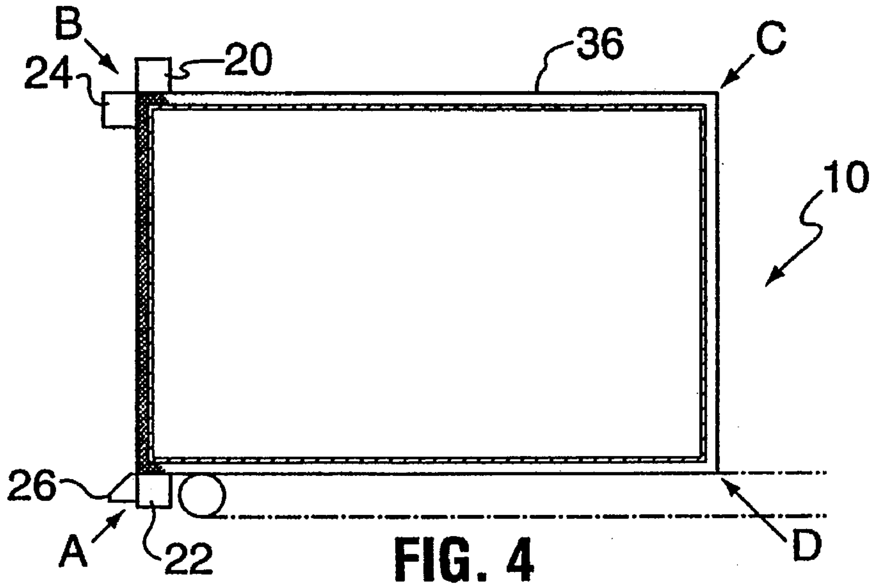
FIG. 4 is a sequential view illustrating the disposition of the elements prior to the onset of application of the sealant to the sides of the assembly.

Referring to FIG. 4, extrusion head 20 has applied at least some sealant material 28 about the corner and is positioned to apply the sealant material 28 along the entire length of lateral side 36.

Figure 5:
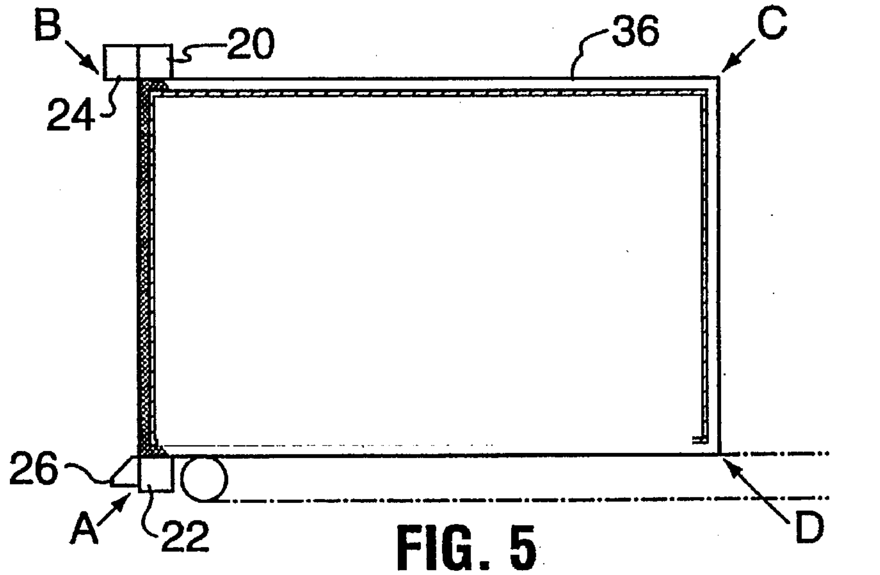
FIG. 5 is a sequential view illustrating the repositioning of the elements prior to the onset of the application of the sealant.

FIG. 5 illustrates the disposition of the wiper member 24 as having moved into position such that it is in collinear relation with head 20.

Figure 6:
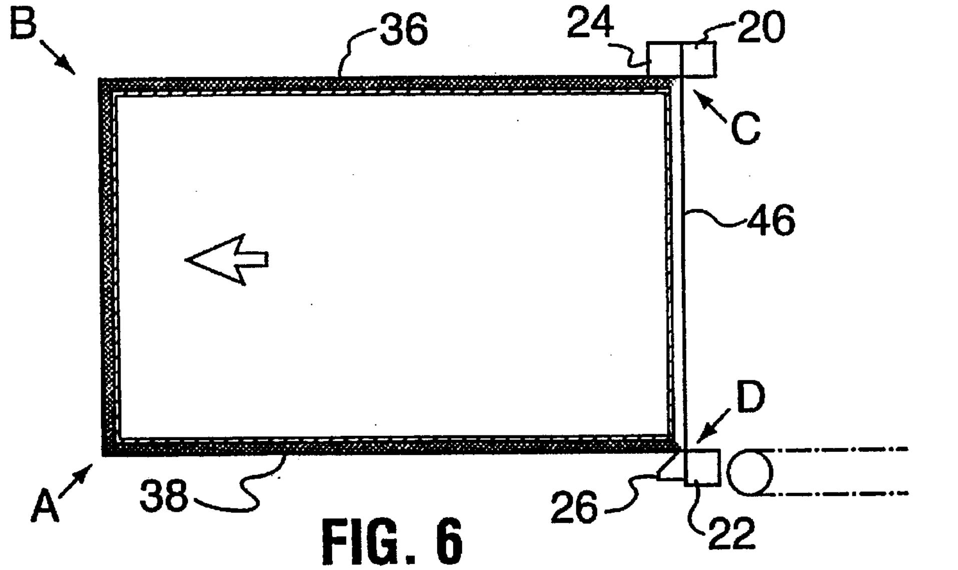
FIG. 6 is a sequential view illustrating the disposition of the elements subsequent to the application of the sealant to the sides.

FIG. 6 illustrates the disposition of the elements 20 through 24 subsequent to sealant application of the transverse sides. With specific reference to elements 20 and 24, the sealant material, as applied to transverse sides 36 and 38, has been completed along this side and the members or elements 20 and 24 now reside generally at corner C of side 36. Similarly, elements 22 and 26 have applied sealant material along the entire length of lateral side 38 of the assembly 10.

In a preferred form, the assembly 10 is advanced on the conveyor 18 such that the substrate is moved relative to elements 20 through 26. Although this is preferred, it will be readily appreciated that the assembly 10 may be non-movable and the members 20 through 26 may be moved relative to the assembly 10.

Figure 7:
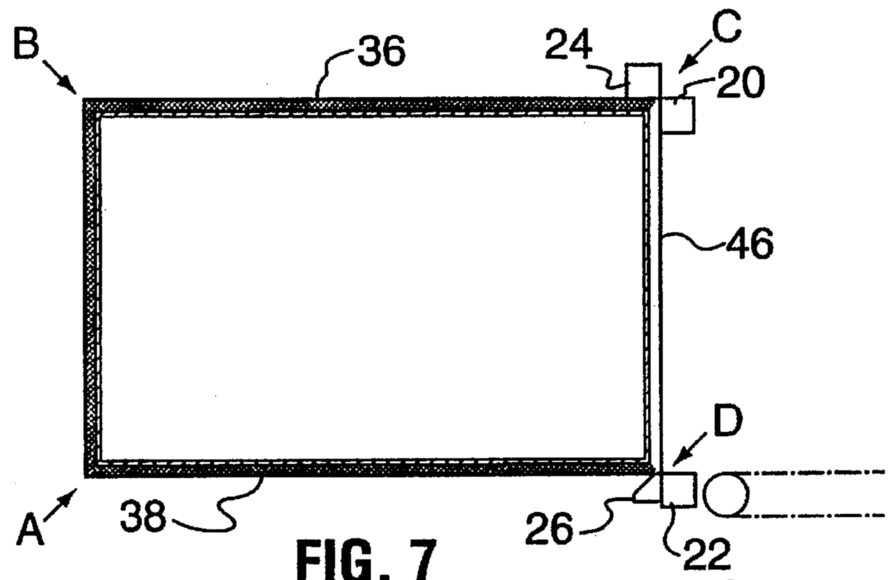
FIG. 7 is a sequential view illustrating the repositioning of the elements prior to the onset of the application of the sealant to the final side.

Turning to FIG. 7, there is schematically illustrated, the arrangement of the members 20 through 26 subsequent to the application of sealant at sides 36 and 42. As illustrated, head 20 is advanced about the corner of the assembly 10 such that the head 20 and wiper member 24 are on opposite sides of the corner.

Figure 8:
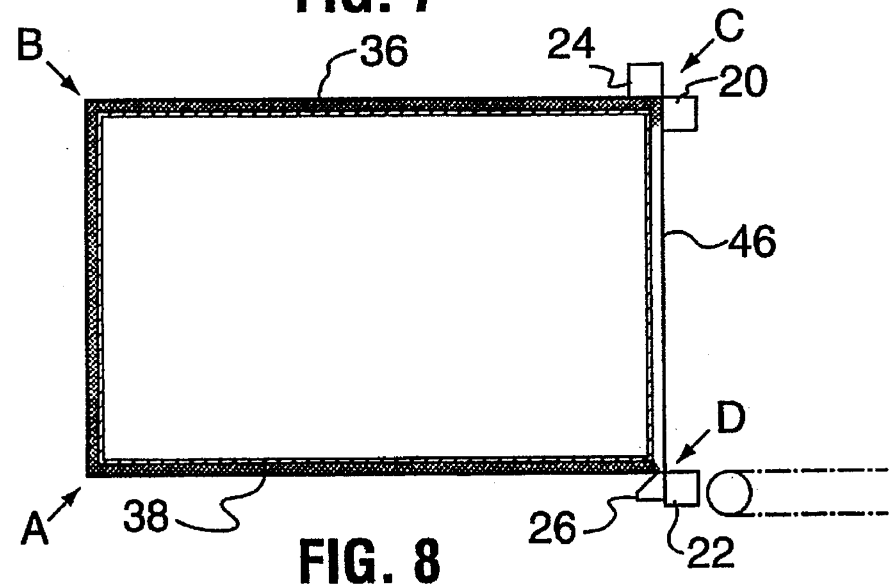
FIG. 8 is a sequential view illustrating the first phase of the application of the sealant to the final side.

FIG. 8 illustrates schematically the following position of the head 20 about the lateral side 46 of assembly 10 as a partial amount of sealant is applied thereto.

Figure 9:
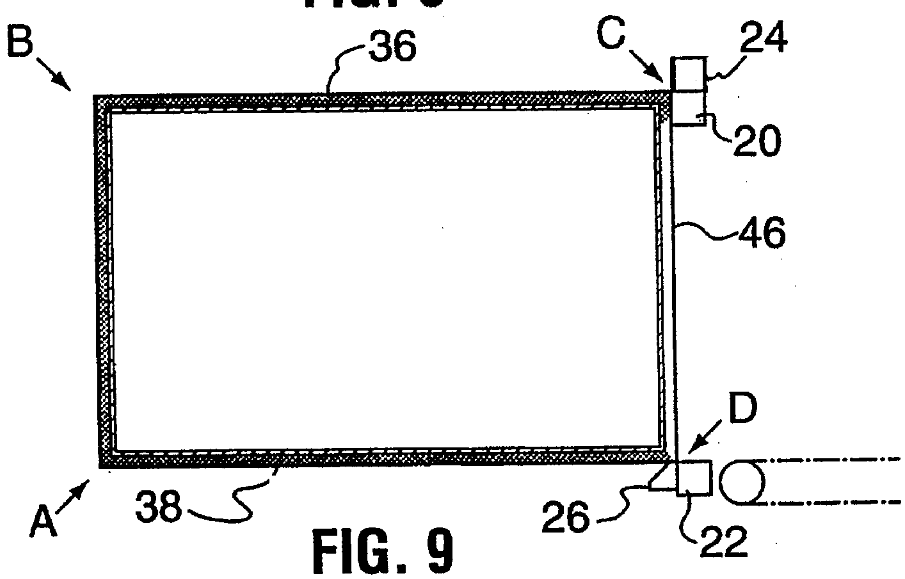
FIG. 9 is a sequential view illustrating the angular displacement of the smoothing block relative to the sealant applying members.

FIG. 9 illustrates the following procedure where wiper member 24 assumes a substantially collinear position with head 20, but remains in a slightly offset relationship relative to head 20. The offset relationship of wiper member 24 relative to head 20 has been found particularly useful since this prevents the contact of wiper 24 with applied sealant 28.

Figure 10:
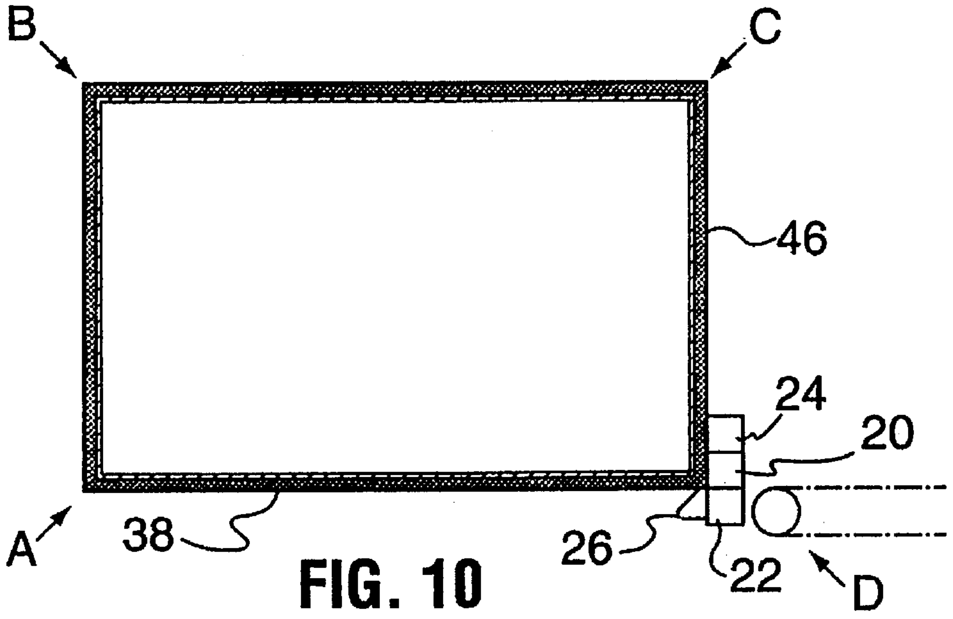
FIG. 10 is a sequential view illustrating the disposition of the elements at the terminal end of the substrate.

Turning to FIG. 10, shown is the disposition of the members 20 through 26 as configured at the terminal corner D of the assembly 10. In the arrangement shown, extrusion heads 20 and 22, as well as wiper member 24, all assume a collinear relationship and remain parallel and coplanar relative to transverse side 46. Similarly, head 22 relative to wiper member 26 are in a collinear relationship and parallel with lateral side 42.

Figure 11:
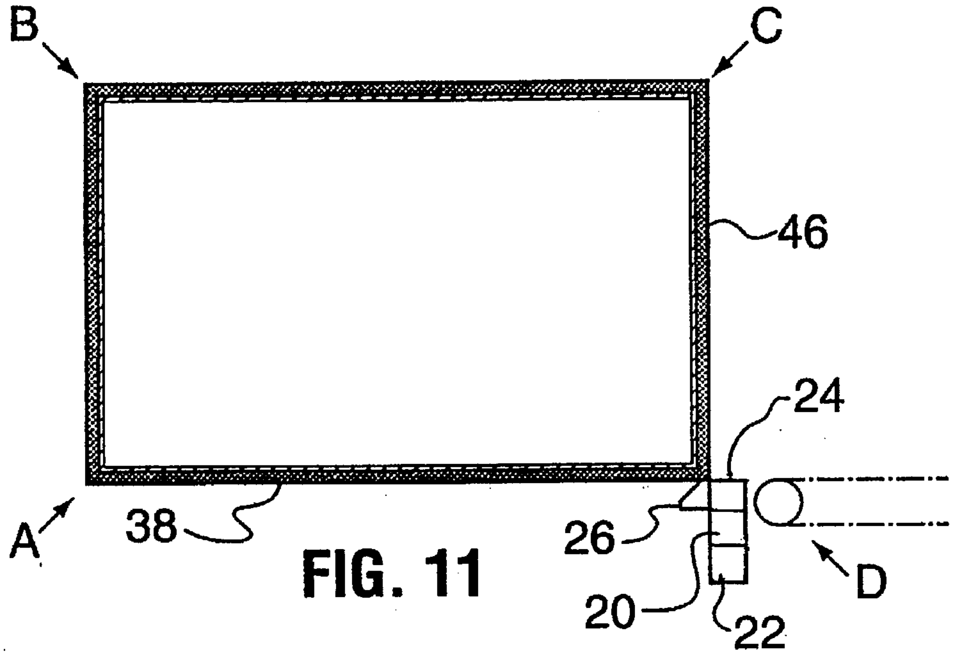
FIG. 11 is a sequential view illustrating the disposition of the elements at the terminal end of the insulated assembly prior to reconfiguration.

Turning to FIG. 11, shown is a first stage which signifies the beginning of the final reconfiguration of the members 20 through 26. At this point, sealant has been applied completely about the perimeter of the assembly and the elements are positioned for reconfiguration.

Conveniently, member 26 may include a fluid dispenser (not shown) for ensuring that any "strings" of sealant 28 stay in contact with the perimeter as opposed to the substrate(s). The source of fluid may be a pressurized gas jet or water, etc.

Figure 12:
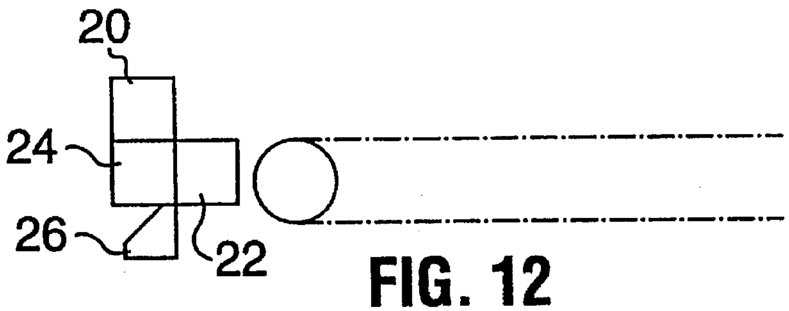
FIG. 12 is sequential view illustrating the reconfiguration of the elements prior to the onset of the application procedure from the start position.

FIG. 12 illustrates the reconfiguration of elements 20 through 26 to the "start" position to permit application of sealant to a further assembly 10 (not shown).

Referring in greater detail to the wiper members 24 and 26, these members primarily function to provide a smoothing surface and a confining area within which sealant may be applied. Returning to FIG. 1, the disposition of the spacer 16 relative to the perimeter 14, provides an area within which the sealant is applied. By providing the smoothing or wiping members 24 and 26, there is created a confined area between the spacer 16 and a respective wiper member 24 or 26. Accordingly, as an extrusion head or nozzle 20 or 22 applies sealant material about the perimeter, a defined and contained area is created and filled with sealant, while at the same time, being smoothed by the wiper member 24 or 26. As indicated herein and previously, the wiper members 24 and 26 are movable in concert with heads 20 and 22, respectively.

As will be readily appreciated, the wiping or smoothing members 24 and 26 may be heated to a point above the melting point of the sealant to ensure adequate smoothing without substantial collection of sealant material during the application process. Further, the members 24 and 26 may be composed of a low surface tension material or may be augmented with such a material to provide a non-sticking surface relative to the sealant material.

It will be further appreciated that all of the steps as set forth herein will be of a timed and, therefore, sequentially form. To this end, various optical sensors, switches and other mechanical devices may be employed to assist in the accurate sequencing of the operations.

In a particularly preferred form, the wiper members and extrusion heads will be disposed in a vertically arranged apparatus so that the application procedure can be achieved from an overhead attitude.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A method of applying sealant material between spaced substrates of an assembly having a spacer spaced inwardly from the perimeter of said substrates, said assembly having a pair of opposed lateral edges and a pair of transverse edges, comprising the steps of:

providing applying means for applying sealant material between said substrates and smoothing means associated with said applying means for smoothing sealant material as it is applied;

advancing said applying and smoothing means relative to the edges of the assembly simultaneously applying and immediately smoothing sealant material to the edges of the assembly;

molding a substantially square corner of sealant material at each corner between each of the edges comprising the further steps of:

slidably advancing said applying means from an edge having spacer material applied to it to an adjacent edge at said corner;

slidably advancing said associated smoothing means to an adjacent position on the edge having spacer material applied to it thus closing the space between the substrates in the corner area;

injecting spacer material into the corner area confined by said applying and smoothing means and molding a substantially square of spacer material;

slidably advancing the associated smoothing means in alignment with the applying means on the adjacent edge; whereby the formation of strings of excess material is prevented.

2. A method of applying sealant material as defined in claim 1, wherein said applying means and said smoothing means are slidably moveable relative to one another.

3. A method of applying sealant material as defined in claim 2, wherein the step of applying and smoothing the sealant material includes heating said smoothing means above the melting temperature of the sealant material.

4. A method of applying sealant material as defined in claim 3, wherein said applying means partially apply sealant material to each edge prior to advancing the applying means and smoothing means relative to each edge.

5. A method of applying sealant material between spaced substrates of an assembly having a spacer spaced inwardly from the perimeter of said substrates, said assembly having a pair of opposed lateral edges and a pair of transverse edges, comprising the steps of:

a. providing applying means for applying sealant material between said substrates at a leading corner of said assembly;

b. providing smoothing means associated with said applying means for smoothing sealant material as it is applied;

c. molding a first substantially square corner confined between said applying means and said smoothing means;

d. advancing said applying means and said smoothing means from a starting position to a distal position to apply sealant material to a first transverse edge;

e. slidably advancing said applying means to an adjacent edge of a lateral edge of said assembly at a second distal corner, and advancing said associated smoothing means to an adjacent position at said second distal corner on said first transverse edge;

f. molding a substantially square corner of sealant material confined between said applying means and said smoothing means;

g. aligning said smoothing means with said applying means on a lateral edge;

h. advancing said assembly while simultaneously applying and smoothing sealant material to each said lateral edge during movement of said assembly;

i. slidably advancing said applying means to an adjacent second transverse edge of said assembly at a third corner between said lateral edge and said second transverse edge, and advancing said associated smoothing means to an adjacent position at said third corner;

j. molding a substantially square corner of sealant material confined between said applying means and said associated smoothing means;

k. reversibly advancing said applying means from said distal position to said start position while applying and smoothing sealant material to said second transverse edge;

l. positioning said applying means at a fourth corner on said second transverse edge in cooperation with smoothing means adjacent at said fourth corner on said lateral edge;

m. molding a substantially square corner of sealant material confined between said applying means and said cooperating smoothing means;

n. slidably reconfiguring said applying means and smoothing means for application of sealant material to a next assembly; whereby the formation of strings of excess sealant material is prevented.

* * * * *